(12) United States Patent
Lee

(10) Patent No.: US 8,293,402 B2
(45) Date of Patent: Oct. 23, 2012

(54) BATTERY WITH CIRCUIT BOARD AND LEAD TERMINALS

(75) Inventor: Myung-Jun Lee, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 861 days.

(21) Appl. No.: 12/318,589

(22) Filed: Dec. 31, 2008

(65) Prior Publication Data

US 2009/0176156 A1    Jul. 9, 2009

(30) Foreign Application Priority Data

Jan. 4, 2008  (KR) ................ 10-2008-0001353

(51) Int. Cl.
*H01M 2/34*    (2006.01)
*H01M 2/10*    (2006.01)

(52) U.S. Cl. ......... 429/178; 429/162; 429/163; 429/179

(58) Field of Classification Search .............. None
See application file for complete search history.

(56) References Cited

U.S. PATENT DOCUMENTS

| | | | |
|---|---|---|---|
| 2003/0211385 A1* | 11/2003 | Yamazaki et al. ............ | 429/158 |
| 2006/0046139 A1 | 3/2006 | Suzuki et al. | |
| 2007/0154796 A1 | 7/2007 | Uh | |
| 2007/0264535 A1 | 11/2007 | Lee et al. | |
| 2007/0279001 A1 | 12/2007 | Tononishi | |
| 2008/0008910 A1 | 1/2008 | Koh | |
| 2009/0176155 A1* | 7/2009 | Choi ............................ | 429/178 |

FOREIGN PATENT DOCUMENTS

| | | |
|---|---|---|
| CN | 101083316 A | 12/2007 |
| EP | 1 804 314 A2 | 7/2007 |
| JP | 2001-057191 A | 2/2001 |
| JP | 2002-164029 A | 6/2002 |
| JP | 2002-251986 A | 9/2002 |
| JP | 2004-247261 A | 9/2004 |
| JP | 2009-123646 A | 6/2009 |
| KR | 10-2006-0012810 A | 2/2006 |
| KR | 10-2006-0050550 A | 5/2006 |
| KR | 10-0635743 B1 | 10/2006 |
| KR | 100635743 * | 10/2006 |
| KR | 10-2007-0067781 A | 6/2007 |
| KR | 10-0760784 B1 | 9/2007 |
| KR | 10-2007-0101569 A | 10/2007 |
| WO | WO 2007/061262 A1 | 5/2007 |

OTHER PUBLICATIONS

Second Chinese Office Action in CN 200910001304.9, dated Mar. 30, 2011 (Lee), with English Translation.

* cited by examiner

*Primary Examiner* — Keith Walker
(74) *Attorney, Agent, or Firm* — Lee & Morse, P.C.

(57) ABSTRACT

A protective circuit board, including a mounting board and a plurality of lead terminals disposed at one side of the mounting board, wherein the lead terminals include a first terminal in contact with one side surface of the mounting board, and a second terminal bent at an angle with respect to the first terminal.

4 Claims, 4 Drawing Sheets

BATTERY WITH CIRCUIT BOARD AND LEAD TERMINALS

BACKGROUND OF THE INVENTION

1. Field of the Invention

Embodiments relate to a protective circuit board, a battery pack, and associated methods. More particularly, embodiments relate to a protective circuit board, a battery pack, and a method of fabricating the same, in which an electrical connection structure between an electrode tab of a bare cell and a lead terminal of a protective circuit board is configured so that a plurality of electrode tabs may be electrically connected to the lead terminal at the same time and bond strength between the electrode tab and the lead terminal can be improved.

2. Description of the Related Art

Development and manufacturing of portable electric/electronic devices that are compact in size and light in weight, e.g., cellular phones, notebook computers, camcorders, etc., are actively progressing. Portable electric/electronic devices may include battery packs so that they operate even in places where power is not supplied. The secondary battery is largely classified into a nickel-cadmium (Ni—Cd) battery, a nickel-metal hydride (Ni-MH) battery, and a lithium-ion (Li-ion) secondary battery.

The lithium ion secondary battery has an operating voltage three times higher than that of the Ni—Cd battery or Ni-MH battery, and has high energy density per unit weight, so that it is widely used for a battery pack in portable electronic/electric devices. The lithium ion secondary battery may be classified into a lithium ion battery using a liquid electrolyte and a lithium polymer battery using a polymer electrolyte, depending on the type of an electrolyte to be used. Also, the lithium ion secondary battery may be classified into a prismatic type, a cylindrical type, and a pouch type battery, according to the fabricated shape.

Generally, a battery pack using a lithium ion secondary battery may include a bare cell including an electrode assembly, and a case accommodating the electrode assembly and an electrolyte that enables lithium ions to migrate between the electrode assemblies, and a protective circuit board electrically connected to the bare cell to control voltage or current when the bare cell is charged or discharged.

The electrical connection between the bare cell and the protective circuit board may be achieved by electrically connecting a positive electrode tab and a negative electrode tab, which are electrically connected to the positive electrode plate or the negative electrode plate of the electrode assembly, to the lead terminal of the protective circuit board using welding. Also, since the positive electrode plate and the negative electrode plate may be formed of different materials from each other, in order to maximize efficiency of the bare cell, the positive electrode tab and the negative electrode tab, may also be formed of different conductive materials from each other.

In order to electrically connect the positive electrode tab and the negative electrode tab, which may be formed of different conductive materials from each other, to the electrode terminal of the protective circuit board, a process of electrically connecting the positive electrode tab to the electrode terminal of the protective circuit board, and another process of electrically connecting the negative electrode tab to the electrode terminal of the protective circuit board should be respectively performed. This may cause yield and process efficiency to deteriorate, and bond strength between the positive and negative electrode tabs and the electrode terminal to also deteriorate.

SUMMARY OF THE INVENTION

Embodiments are therefore directed to a protective circuit board, a battery pack, and associated methods, which substantially overcome one or more of the problems due to the limitations and disadvantages of the prior art.

It is therefore a feature of an embodiment to provide a battery pack wherein the positive electrode tabs and negative electrode tabs are formed of different material.

It is therefore another feature of an embodiment to provide a method of making a battery back wherein the connection of the negative electrode tab to the terminal and the positive electrode tab to the terminal occurs at substantially the same time.

At least one of the above and other features and advantages may be realized by providing a protective circuit board, including a mounting board, and a plurality of lead terminals disposed at one side of the mounting board, wherein the lead terminals include a first terminal in contact with one side surface of the mounting board, and a second terminal bent at an angle with respect to the first terminal.

The first terminal may be substantially perpendicular to the second terminal.

The mounting board may include a plurality of through holes at least partially exposing the first terminal to the side of the mounting board opposite to the first terminal.

The plurality of lead terminals may include nickel.

At least one of the above and other features and advantages may also be realized by providing a battery pack, including an electrode assembly, a case including a cavity for accommodating the electrode assembly, and a sealing unit for sealing the accommodation unit, a plurality of electrode tabs electrically connected to the electrode assembly and at least partially protruding outside the case, and protective circuit board including a mounting board and a plurality of lead terminals which are disposed at one side of the mounting board and electrically connected to the electrode tabs, wherein the lead terminals at least partially surround the electrode tabs.

The lead terminal may include a first terminal in contact with one side surface of the mounting board and a second terminal bent to at least partially surround the electrode tab.

The electrode tab may be in contact with the first terminal of the lead terminal.

The mounting board may include a plurality of through holes at least partially exposing the first terminal to the side of the mounting board opposite to the first terminal.

The electrode tab may be in contact with a side surface of the mounting board where the through hole is disposed.

The plurality of electrode tabs may include at least one positive electrode tab and at least one negative electrode tab, and the positive electrode tab may include a different conductive material from the negative electrode tab.

At least one of the above and other features and advantages may also be realized by providing a method for fabricating a battery pack, including providing a bare cell including an electrode assembly and a case accommodating the electrode assembly, a plurality of electrode tabs being electrically connected to the electrode assembly and protruding outside the case, providing a protective circuit board including a mounting board and a plurality of lead terminals having a first terminal in contact with one side surface of the mounting board and a second terminal bent at an angle with respect to the first terminal, aligning the bare cell and the protective circuit board so that the plurality of electrode tabs are disposed adjacent to a surface of the mounting board, bending the second terminal of the lead terminal so that the lead terminal at least partially surrounds a corresponding electrode tab, and electrically connecting the lead terminals to the corresponding electrode tabs.

The second terminal of the lead terminal may be bent to be substantially perpendicular to the first terminal of the lead terminal prior to bending the second terminal to at least partially surround the corresponding electrode tab.

The method may further include forming a plurality of through holes at least partially exposing the first terminal to the side of the mounting board in the mounting board opposite to the first terminal.

The method may further include electrically connecting the first terminal of the lead terminal to one side of the electrode tab through the through hole.

The method may further include electrically connecting the second terminal to the side of the electrode tab opposite to the side of the electrode tab electrically connected to the first terminal.

Electrically connecting the first terminal of the lead terminal to one side of the electrode tab and Electrically connecting the second terminal of the lead terminal to the side of the electrode tab opposite to the side of the electrode tab electrically connected to the first terminal may be performed substantially simultaneously.

The bare cell and the protective circuit board may be aligned so that each electrode tab of the bare cell is in contact with the corresponding first terminal of the lead terminal.

The plurality of electrode tabs may include at least one positive electrode tab and at least one negative electrode tab, and the lead terminal of the protective circuit board may include a positive lead terminal electrically connected to the positive electrode tab, and a negative lead terminal electrically connected to the negative electrode tab, and the electrical connections between the positive electrode tab and the positive lead terminal, and between the negative electrode tab and the negative lead terminal, may be formed substantially simultaneously.

Each electrode tab may be welded to the corresponding lead terminal.

The first terminal of each lead terminal and the corresponding electrode tab of the bare cell may be in contact with opposite side surfaces of the mounting board from one another.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
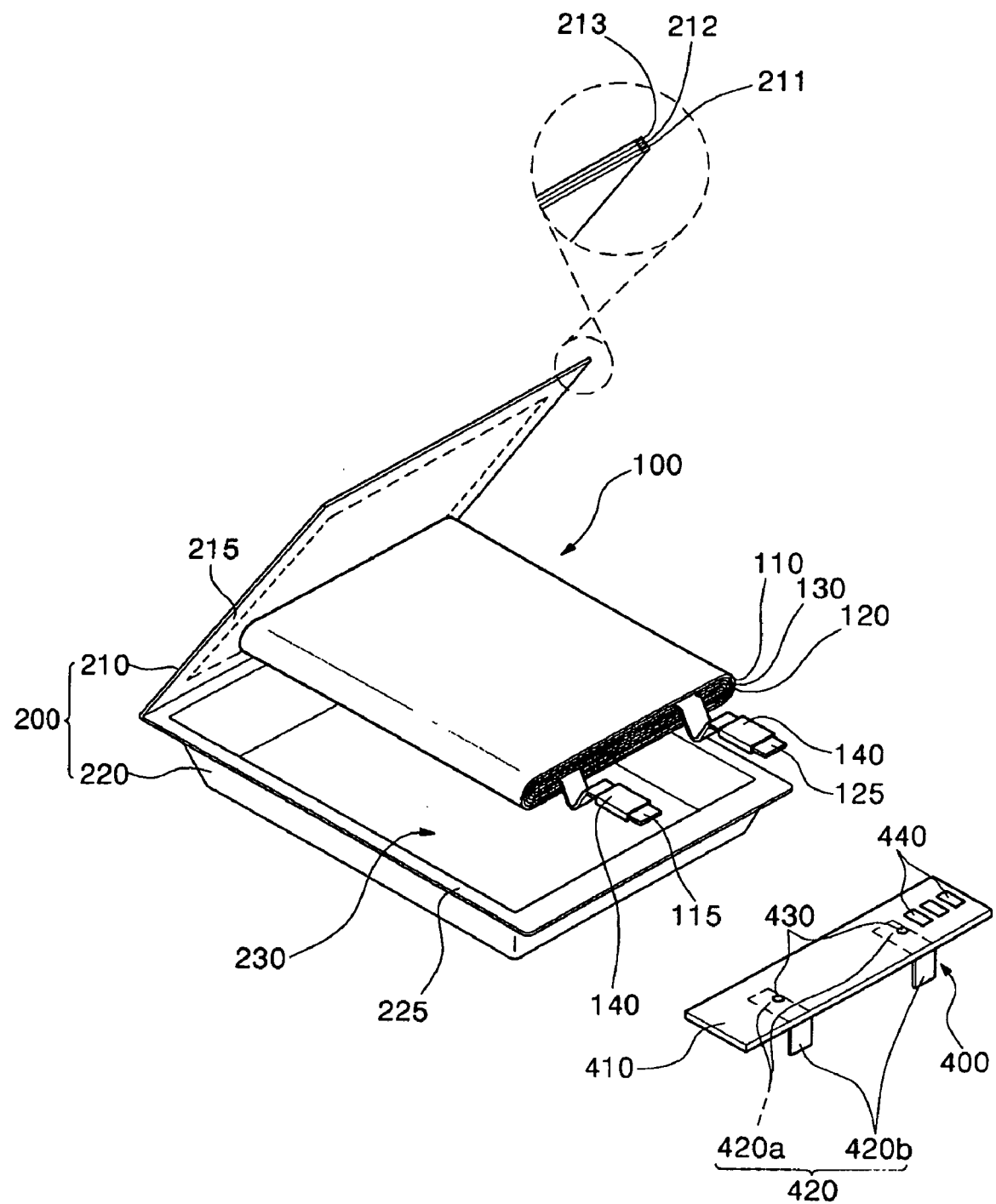
FIG. 1 illustrates an exploded perspective view of a battery pack according to an exemplary embodiment.

Korean Patent Application No. 10-2008-0001353, filed on Jan. 4, 2008, in the Korean Intellectual Property Office, and entitled: "Protective Circuit Board, Battery Pack and Method of Fabricating the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an $n^{th}$ member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B and, C together, whereas the expression "either A, B, or C" means one of A alone, B alone, and C alone, and does not mean any of both A and B together; both A and C together; both B and C together; and all three of A, B and C together.

As used herein, the terms "a" and "an" are open terms that may be used in conjunction with singular items or with plural items. For example, the term "a metal layer" may represent a single compound, e.g., aluminum, or multiple compounds in combination, e.g., aluminum mixed with steel.

The present invention will now be described more fully hereinafter with reference to the accompanying drawings, in which exemplary embodiments of the invention are shown. This invention may, however, be embodied in different forms and should not be construed as limited to the embodiments set forth herein. The same reference numerals are used to denote the same elements throughout the specification. When it is described that a part is "connected" to another part, it may be construed as meaning "electrically connected" with a device interposed therebetween.

Referring to FIG. 1, a battery pack according to an exemplary embodiment may include a bare cell including an electrode assembly 100 and a case 200 having a cavity for accommodating the electrode assembly 100. The case 200 may include sealing units 215 and 225 for sealing the cavity 230. The battery may further include a positive electrode tab 115 and a negative electrode tab 125, which may be electrically connected to the electrode assembly 100 and partially protrude outside the case 200 in parallel. The battery may also include a protective circuit board 400 electrically connected to the electrode assembly 100 of the bare cell.

The electrode assembly 100 may include a positive electrode plate 110 including positive electrode active materials (not shown) and a positive electrode collector (not shown) on which the positive electrode active materials may be coated. The electrode assembly 100 may also include a negative electrode plate 120 including negative electrode active materials (not shown) and a negative electrode collector (not shown) on which the negative electrode active materials may be coated. The electrode assembly may also include a separator 130 disposed between the positive electrode plate 110 and the negative electrode plate 120.

A transition metal oxide containing lithium or a lithium chalcogenide compound, which may be represented by a metal oxide such as $LiCoO_2$, $LiNiO_2$, $LiMnO_2$, $LiMn_2O_4$ or $LiNi_{1-x-y}CO_xM_yO_2$ (here, $0 \leq x \leq 1$, $0 \leq y \leq 1$, and $0 \leq x+y \leq 1$, and M may be a metal such as Al, Sr, Mg, La, etc.), may be used as the positive electrode active material. Also, the negative electrode active materials may be carbon materials, (e.g., crystalline carbon, amorphous carbon, carbon composite, carbon fiber, etc.), a lithium metal, or a lithium alloy.

The positive electrode collector and the negative electrode collector may include at least one of stainless steel, nickel, copper, aluminum, and an alloy thereof. Preferably, the positive electrode collector is formed of aluminum or an aluminum alloy and the negative electrode collector is formed of copper or a copper alloy to maximize efficiency.

The separator 130 may be disposed between the positive electrode plate 110 and the negative electrode plate 120 to prevent an electrical short circuit while enabling the migration of lithium ions. The separator 130 may be formed of, e.g., a polyolefin-based polymer layer, e.g., polyethylene (PE) or polypropylene (PP), or a multilayer thereof.

The case 200 may include a first case 210 having a first sealing unit 215 formed at its edge, and a second case 220. The second case 220 may include the cavity 230 for accommodating the electrode assembly 100. The second sealing unit 225 may be formed on the second case to correspond to the first sealing unit 215. The cavity 230 of the second case 220 may be formed by a press process. While, in an exemplary embodiment, it is illustrated that the cavity 230 may be formed in the second case 220 disposed at a lower part of the case 200, the cavity 230 may be formed in the first case 210 disposed at an upper part of the case 200.

The first case 210 and the second case 220 may have a multilayer structure. The layers may include a metal layer 212, a thermal fusion layer 211, and an insulating layer 213. The thermal fusion layer 211 may be formed on a side where the first case 210 is in contact with the second case 220. The insulating layer 213 may be formed on the opposite side. The metal layer 212 may be formed in between the thermal fusion layer 211 and the insulating layer 213. The metal layer 212 may include at least one of aluminum, steel, stainless steel, and an alloy thereof. The insulating layer 213 may include at least one of polyethylene terephthalate (PET), nylon, or a stacked layer thereof.

Also, the thermal fusion layer 211 may include at least one of cast polypropylene (CPP), polypropylene (PP), or a stacked layer thereof, and/or may be formed of any suitable material having thermal fusion characteristics to function as a sealing material.

The positive electrode tab 115 and the negative electrode tab 125 may be electrically connected to the positive electrode plate 110 and the negative electrode plate 120 of the electrode assembly 100, respectively. The positive electrode tab 115 and negative electrode tab 125 may partially protrude outside the case 200, substantially parallel to one another. In order to prevent the cavity 230 from unsealing, the positive electrode tab 115 and the negative electrode tab 125 may each include an insulating tab tape 140 disposed at a region where the sealing units 215 and 225 are in contact with the positive and negative electrode tabs 115 and 125.

The protective circuit board 400 may include two lead terminals 420 disposed on one side of the mounting board 410, to be electrically connected to the positive electrode tab 115 and the negative electrode tab 125, respectively. The protective circuit board 400 may further include external terminals 440 electrically connected to external loads (not shown). While it is described that the positive electrode tab 115 and the negative electrode tab 125 protrude outside the case 200 in an exemplary embodiment, a plurality of positive electrode tabs 115 and a plurality of negative electrode tabs 125 may protrude outside the case 200 as necessary. The number of the lead terminals 140, which are electrically connected to the positive electrode tabs 115 and the negative electrode tabs 125, may be equal to the sum of the positive electrode tabs 115 and the negative electrode tabs 125 protruding outside the case 200.

The mounting board 410 may be electrically connected to the electrode assembly 100 of the bare cell through the lead terminals 420. One or a plurality of parts (not shown) for controlling voltage or current when the bare cell is charged or discharged may be mounted on the mounting board. Conductive patterns (not shown) for electrically connecting between the lead terminals 420, the mounting parts, and the external terminals 440 may be formed on the mounting board 410.

The lead terminals 420 may include a first terminal 420a that is in contact with one side surface of the mounting board 410, and a second terminal 420b. Prior to assembly, the second terminal 420b may be bent to be substantially perpendicular to the first terminal 420a and may protrude away from one side of the mounting board 410. In order to enable the positive electrode tab 115 and the negative electrode tab 125 to be electrically connected to the first terminals 420a, a through hole 430 may be formed in the mounting board 410, at least partially exposing the first terminals 420a to the opposite side of the mounting board 410.

Figure 2A:
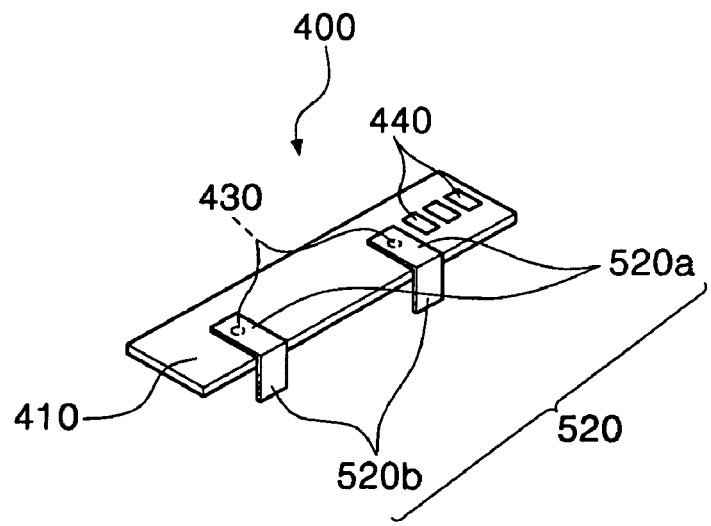
FIGS. 2A and 2B illustrate perspective views of different configurations of a protective circuit board of a battery pack according to an exemplary embodiment.

As illustrated in FIG. 2A, first terminals 520a of a lead terminal 520 may be in contact with the side surface of the mounting board 410 where the external terminals 440 are formed. Second terminals 520b of the lead terminal 520 may protrude away from one side of the mounting board 410.

Figure 2B:
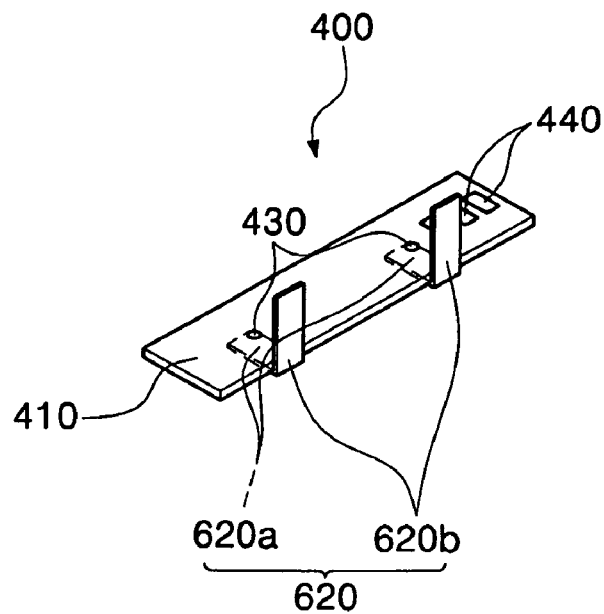

Also, as illustrated in FIG. 2B, first terminals 620a of a lead terminal 620 may be in contact with the side surface of the mounting board where the external terminal 440 is not formed, and second terminals 620b of the lead terminal 620 may protrude in a direction away from the side of the mounting board 410 on which the external terminal 440 is formed.

A process of fabricating a battery pack according to an exemplary embodiment will now be described with reference to FIGS. 1 and 3A to 3D.

Figure 3A:
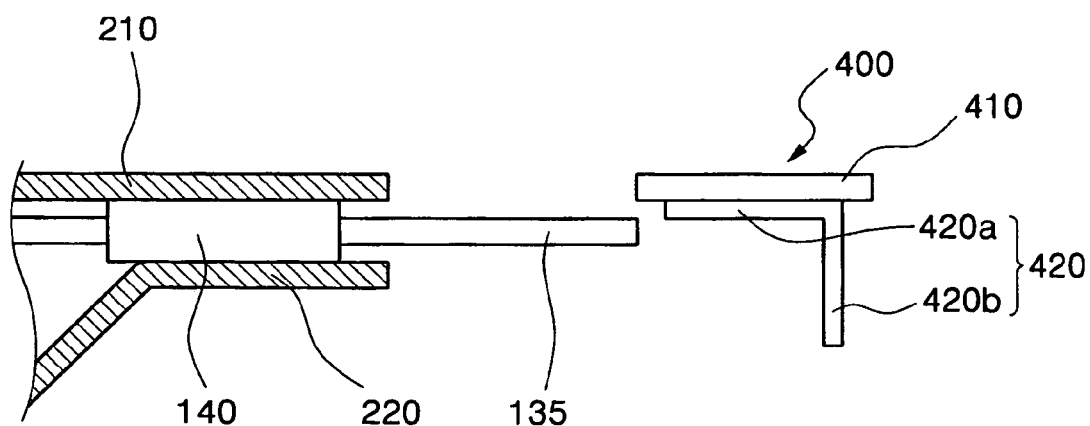
FIGS. 3A to 3D illustrate cross-sectional views sequentially showing a process of fabricating a battery pack according to an exemplary embodiment.

First, as illustrated in FIG. 3A, a bare cell may be provided, having a plurality of electrode tabs 135 electrically connected to the electrode assembly 100 and protruding outside the case 200, substantially parallel to one another. There may also be provided a protective circuit board 400 including a mounting board 410 and a plurality of lead terminals 420. The lead terminal 420 may include the first terminal 420a that is in contact with one side surface of the mounting board 410, and the second terminal 420b that may be bent at an angle with respect to the first terminal 420a.

In the lead terminal 420, a region corresponding to the first terminal 420a is in contact with one side surface of the mounting board 410, the other region corresponding to the second terminal 420b that is not in contact with one side surface of the mounting board 410 may be bent, so that an angle may be formed between the first terminal 420a and the second terminal 420b. During assembly, the second terminal 420b may be bent to at least partially surround the electrode tab 135 of the bare cell. Thus, the first terminal 420a may be substantially perpendicular to the second terminal 420b so that the second terminal 420b can easily be bent to at least partially surround the electrode tab 135.

Figure 3B:
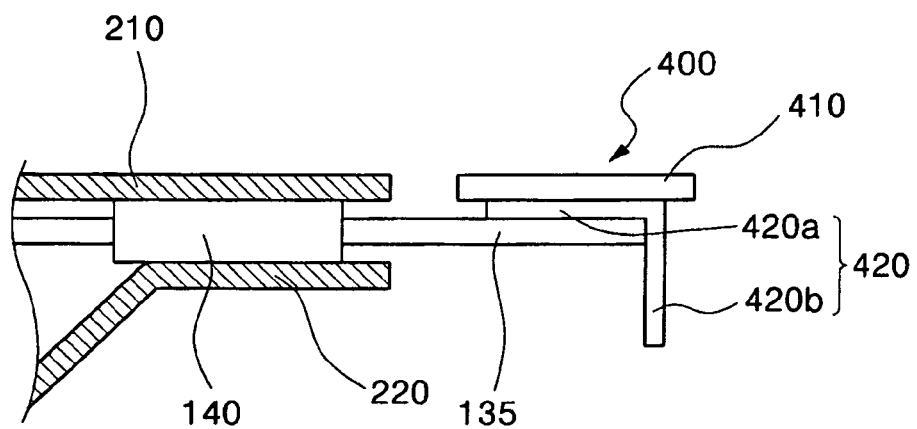

As illustrated in FIG. 3B, the bare cell and the protective circuit board 400 may be aligned so that the first terminal 420a of the lead terminal 420 is in contact with the electrode tab 135. Alternatively, referring again to FIG. 2B, the electrode tab 135 may be in contact with the side surface of the mounting board 410 opposite to the first terminal 420a of the lead terminal 420.

Figure 3C:
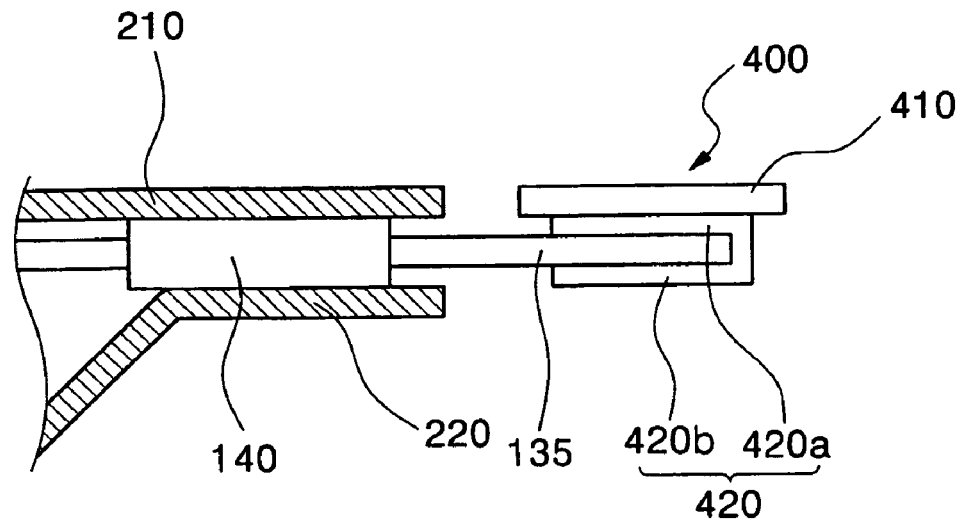

As illustrated in FIG. 3C, the second terminal 420b of the lead terminal 420 may be bent so that the lead terminal 420 at least partially surrounds the electrode tab 135. The second terminal 420b may be electrically connected to at least one side of the electrode tab 135 that is in contact with the second terminal 420b. In order to further strengthen the electrical connection between the lead terminal 420 and the electrode tab 135, a through hole 430, which is disposed on one side surface of the mounting board 410 to the opposite side of the mounting board 410, may be formed in the mounting board 410. The through hole 430 may at least partially expose the first terminal 420a. The first terminal 420a may be electrically connected to a side of the electrode tab 135 through the through hole 430. A process of electrically connecting the second terminal 420b to one side of the electrode tab 135 and a process of electrically connecting the first terminal 420a to the opposite side of the electrode tab 135, through the through hole 430, may be performed substantially simultaneously.

The electrical connection between the lead terminal 420 and the electrode tab 135 may be achieved through welding, e.g., a resistance welding, taking into account an impact that may be given to mounting parts, which may be mounted on the mounting board 410 and the electrode assembly 100 through the electrical connection processes. The lead terminal 420 may include a nickel material, taking into account conductivity.

Figure 3D:
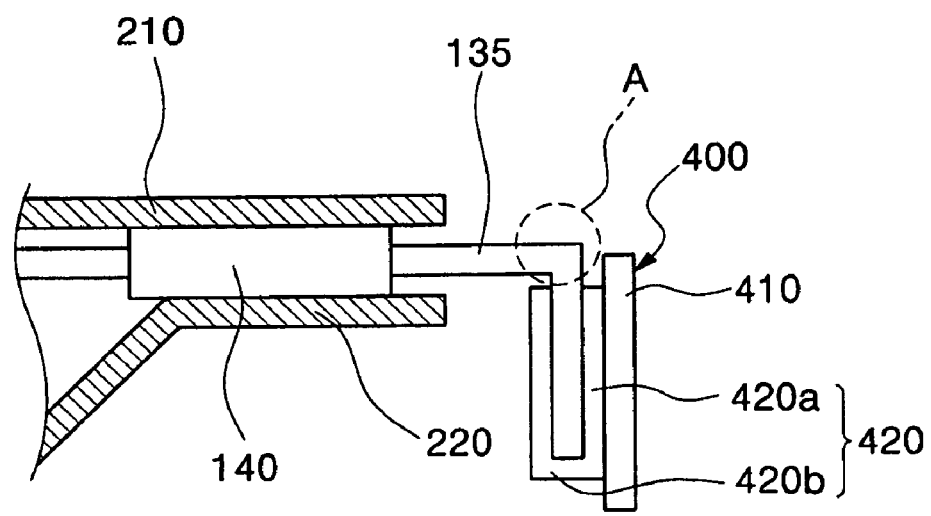

As illustrated in FIG. 3D, in order to fix the protective circuit board 400, a region A of the electrode tab 135 may be bent, so that the protective circuit board 400 is substantially parallel to one side surface of the bare cell. Then, a molding process for filling a space between the protective circuit board 400 and the bare cell with a molding material, e.g., hot-melt or resin, may be performed to fix the protective circuit board 400 and the bare cell. This may further prevent the electrical connection between the protective circuit board 400 and the bare cell from being short circuited by an external impact.

In the following Table 1, weld strength between the positive and negative electrode tabs and a lead terminal of a battery pack according to an exemplary embodiment and a conventional battery pack are compared.

TABLE 1

|  | Weld Strength between Positive Electrode Tab and Electrode Terminal (kgf) | Weld Strength between Negative Electrode Tab and Electrode Terminal (kgf) |
| --- | --- | --- |
| Conventional Battery Pack | 2.25 | 2.35 |
| Battery Pack According to an embodiment | 2.75 | 2.85 |

As shown in Table 1, compared with the conventional battery pack, the battery pack according to an embodiment exhibits increased weld strength between the positive electrode tab and the corresponding electrode terminal and between the negative electrode tab and the corresponding electrode terminal.

Accordingly, in the battery pack of an embodiment, the lead terminal of the protective circuit board may surround the electrode tab, e.g., the positive electrode tab and the negative electrode tab of the bare cell, and then the lead terminal may be electrically connected to the electrode tab. The electrode terminals of the protective circuit board may be electrically connected to the positive electrode tab and the negative electrode tab of the bare cell at essentially the same time. The weld strength between the positive electrode tab and the electrode terminal and between the electrode terminal and the negative electrode tab may be enhanced.

In a battery pack according to an embodiment, electrode terminals of a protective circuit board may at least partially surround a positive electrode tab and a negative electrode tab of a bare cell. This may allow the electrode terminals of the protective circuit board to be electrically connected to the positive electrode tab and the negative electrode tab of the bare cell at substantially the same time. This may result in increased yield of the battery pack and increased process efficiency. Also, the weld strength between the electrode terminal and the positive electrode tab and between the electrode terminal and the negative electrode tab of may be enhanced. Therefore, the electrical connection between the protective circuit board and the bare cell may be further strengthened.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
an electrode assembly;
a case including a cavity for accommodating the electrode assembly, and a sealing unit for sealing the case;
a plurality of electrode tabs electrically connected to the electrode assembly and at least partially protruding outside the case; and
a protective circuit board including a mounting board and a plurality of lead terminals which are disposed at one side of the mounting board and electrically connected to the electrode tabs,
wherein:
the lead terminals at least partially surround the electrode tabs, the lead terminals each include a first terminal in contact with one side surface of the mounting board and a second terminal bent to surround at least two sides of a corresponding one of the electrode tab, and the mounting board includes a plurality of through holes at least partially exposing the first terminal to another side of the mounting board opposite to the first terminal.

2. The battery pack as claimed in claim 1, wherein each electrode tab is in contact with the first terminal of the lead terminal.

3. The battery pack as claimed in claim 1, wherein each electrode tab is in contact with a side surface of the mounting board where the through hole is disposed.

4. The battery pack as claimed in claim 1, wherein the plurality of electrode tabs includes at least one positive electrode tab and at least one negative electrode tab, and the positive electrode tab includes a different conductive material from the negative electrode tab.

* * * * *